Patented Sept. 11, 1934

1,973,281

UNITED STATES PATENT OFFICE 1,973,281

PROCESS OF MAKING VEGETABLE PRODUCT

Michele Bonotto, Torino, Italy, assignor, by mesne assignments, to American Soya Products Corporation, Evansville, Ind., a corporation of Indiana No Drawing. Application March 19, 1930, Serial No. 437,265

7 Claims. (Cl. 99—10)

This invention relates to a refined vegetable product and process of making same.

One of the objects of my invention is to produce a product comprising bleached and taste-purified soya beans or other acrid-tasting and colored vegetables from which all the colors except white and all characteristic and unpleasant taste have been removed and which may then be employed in the manufacture of normal, condensed or powdered milk, yeast-nourishing food in either liquid, condensed or powdered form, flour, milk for cheese manufacture, casein for industrial uses, and other additional manufactured products.

Still another object of my invention is to produce a product that will not only be pure white in dry form, but will retain its pure white color without change of color when wetted or mixed with water.

Still another object of my invention is to utilize the water-absorbing properties of the beans and especially to utilize the water-absorbing properties of dried beans in order to introduce into the structural parts of the body of the bean a soluble oxidizing agent and preferably sulphur dioxide which is capable upon liberation from a water solution of bleaching and purifying the structural substances of the beans by oxidizing the color-producing substances to cause the same to assume a pure white color, thus completely removing the natural dark colors and entirely eliminating the characteristic taste and odors, and the excess of said oxidizing agent is also capable of being eliminated from the structural substances of the beans by the application of heat and without the use of a neutralizing agent which would leave a reaction product in the beany substance.

Another object of my invention is to provide a process by which the chlorophyl pigment and taste-producing ethers may be completely removed from the soya bean without substantially changing or altering the protein, fatty substance and other constituents of the beans.

Still another object of my invention is to utilize soya beans or like legumes having the oil cells thereof unruptured in order to protect the oil contents from oxidizing action of the oxidizing agent during the operation of oxidizing the pigmented substances such as chlorophyl and the consequent complete bleaching and purifying of the structure of the beans.

I will now describe my process of removing the coloring matter and taste as applied to soya beans.

Soya beans being very rich in protein and oil or fatty substance are especially well adapted for producing a product rich in protein and having high yeast-nourishing and bread-leavening properties.

In carrying out my process, I preferably employ dried soya beans in order to utilize the greater absorbing properties of such beans in the introduction into the structural parts of the bean of an oxidizing agent. In the preferred form of my invention, I utilize a single oxidizing agent capable of bleaching the colored structural parts to pure white and also capable of purifying the taste thereof. I also preferably utilize the soya beans either whole or in pieces preferably having a maximum number of the oil cells unruptured so as to provide as much protection as possible against oxidizing the oil during the oxidizing of the pigmented substances for the purpose of bleaching and taste-purifying of the proteins and other substances. It will be understood that by the use of my invention, I am enabled to use soya beans of any color, such as yellow, black, green or red beans, all of which are rich in nitrogenous substances.

In my process, I am, by the use of my oxidizing agent, enabled economically to completely bleach and entirely purify the taste of the structural substances of the bean itself and preferably take advantage of said physical properties of the bean, first, in order to introduce the oxidizing agent and to provide access therefor into and throughout the structural substances comprising the body of the bean and, secondly, in order to protect the oil while in the oil cells from the oxidizing agent during the bleaching and eliminating of the acrid, unpleasant taste and also during the elimination of the oxidizing agent from the beans.

In my preferred process, I avoid high temperatures and high concentration of the oxidizing agent, and treat dried beans without rupturing the cellular structure so that the oil cells are kept intact and protects the oil from full access of the oxidizing agent.

I also preferably treat the beans with an oxidizing agent which preferably both purifies the taste and bleaches the beany substance and which is soluble in water and capable, after performing its bleaching and purifying function, of elimination from the beans by the use of heat and without the necessity of using a neutralizing agent which would leave a reaction product or products in the beany substance.

In the preferred form of my process, the vegetables, and particularly soya beans, in the whole dried bean or in such pieces as will avoid rupturing of the oil cells thereof are subjected to a bath containing a water-soluble oxidizing agent of the type hereinabove specified at such relatively low temperatures as will not substantially change or alter the proteins and other substances from their natural raw state as found in the bean and in all phases of my processes, I preferably avoid such high temperatures for any such time periods as would materially alter the natural protein or the oil and fat contents thereof. In some cases, however, where it is not desired to procure a raw and uncoagulated protein product, I may accelerate the absorption by the beans of the oxidizing agent by utilizing steam, as hereinafter more particularly described.

The substances in the soya beans and also in other acrid tasting and colored vegetables which color the manufactured product constitute chlorophyl pigment or chlorophyl bodies and the substances which lend the characteristic taste to the soya bean comprises ethers and substances of varying compositions and in the production of a soya bean product of the type hereinabove specified and particularly in producing a product for use as a yeast-nourishing and bread-leavening product for white bread, it is desirable that these chlorophyl bodies be completely bleached so as to eliminate from the product any color which would, for example, appear in the baking process of the bread, and I accomplish this result as well as the removal of the taste-giving ethers and substances without coagulation of the protein or oxidation of the oils and fats of the beans and without leaving any reaction products due to neutralizing of the bleaching and taste-purifying agent.

In carrying out my process, I preferably take dried soya beans which may be either skinned or unskinned and cut or break the same in halves or other pieces. Soya beans so cut are in such a condition that the oil cells of the beans are unruptured and, in the preferred form of my invention, I immerse a charge of the beans in a very weak and unstable solution of sulphur dioxide and water ($SO_2$ plus $H_2O$). This solution, however, preferably contains a quantity of sulphur dioxide in excess of the amount necessary to bleach and purify the charge of beans. I maintain the beans in this solution for a period of time until they are completely saturated with the solution, which at normal temperature, I find happens in about ten hours. When so treated, the beans will swell or expand and the solution will be absorbed to such an extent as to thoroughly penetrate the entire structure of the beans. The concentration of the solution and temperature is preferably such as not to change or transform the protein or oil or fat constituents of the soya bean while oxidizing and bleaching the chlorophyl pigment contained in the chlorophyl bodies and also completely eliminating the taste produced by the taste-producing substances contained in the beans.

While in the preferred form of my process hereinabove described, I utilize, as the charge of material to be refined, soya beans or leguminous vegetables either whole or in pieces having a maximum number of the oil cells in unruptured condition, it will be obvious that my process may be employed upon material which is broken, sliced, cracked or crushed into any suitable palpable fragmentary particles in any suitable manner, as, for example, by the use of any suitable machinery, including such conventional machines as a slicing machine or a corn degerminator.

It will be understood, however, that the finer the fragmentary particles, the more oil cells will be ruptured and the more oil will be oxidized.

When, however, it is not desired to procure a product in which the protein is unaltered, I may subject the beans to sulphur dioxide ($SO_2$) in a current of steam and may thus shorten the period of time from approximately ten hours, as aforesaid, to approximately two hours.

After the specified periods of time, the length of which will, to some extent, depend upon the concentration of the solution and the temperature thereof, the solution will have penetrated the beans to such an extent as to enable the chlorophyl pigment of the beans to be oxidized and changed to a pure white color and the characteristic taste entirely removed but sulphur dioxide will still remain in the water solution in the beans. The oxidizing agent is then liberated from the solution in gaseous form. In the case of my said preferred refining agent specified, this may be accomplished without the use of a neutralizing agent which would leave in the beany substance a reaction product or residue.

It is desirable, if not absolutely essential, in a practical process, that a suitable quantity of heat be employed in order to facilitate and accelerate the liberation from the solution of the sulphur dioxide so as to cause this oxidizing agent to have its bleaching and taste-purifying action on the beany substance and also to expel or to facilitate and accelerate the elimination from the beans of the excess of the sulphur dioxide. For this purpose, the beans so treated may be kept for a time at a certain temperature, and, in the preferred form of my invention, in order to procure the most desirable product in which the protein will be substantially unaltered or unchanged from the natural raw state and the fatty substances will also remain unaltered, I apply the quantity of heat necessary in two operations. Thus, I subject the beans for twenty to thirty minutes to a temperature of 60° to 80° C., and thereafter subject the said beans to a temperature of 100° C. for one to four minutes.

This quantity of heat may be applied in any desirable manner. For example, the beans may be subjected to a bath of pure water at the aforesaid temperature of 60° to 80° C., and the beans may then be subjected to a current of steam (100° C.) for one to four minutes.

The said liberation, reaction and elimination of the sulphur dioxide may also be accomplished by washing with pure water if the washing is continued for a sufficiently long period of time until all the sulphur dioxide is completely eliminated from the beans and the bath.

Instead of washing the beans in cold or warm water, as aforesaid, or by extracting or removing the same from the sulphur dioxide bath and submerging them in another bath of pure water, I may, if desired, empty or drain the tank containing the water solution of sulphur dioxide leaving the beans in this tank and I may then circulate through this tank in any suitable manner pure water preferably of the temperature and for the time hereinabove specified and I may subject the beans in the same container or receptacle to the action of steam at 100° C. for the time hereinabove specified.

The treatment of the soya beans in water at 60° to 80° C. for the time specified will not alter or change the protein or any of the fat or oil constituents of the soya bean nor will the subjection of the same to steam for the period specified have any such effect.

After washing and steaming of the beans in the manner hereinabove specified, the skins of the beans, if not theretofore removed, may then be removed, the skinned beans may be ground with water and then filtered or treated centrifugally to procure the milk or extracts of the bean which can be used in its pure form or, if preferred, the milk may be concentrated or condensed by any conventional method or it may by any suitable conventional method be powdered and utilized either in its pure powdered form or with the addition thereto of other salts which are conventionally employed in products of this type.

Another method of utilizing the refined product of my invention is to grind the refined beans to flour in any conventional manner and then to utilize this refined soya bean flour as the resultant product.

My protein product may be employed in the manufacture of many other known products such as the making of baby food, the use of the milk in cheese and ice-cream manufacture and the manufacture of casein for industrial purposes, etc.

It will be understood that when my process hereinabove described is carried out on soya beans or like legumes, I produce a new refined leguminous soya bean product which will have a white color, because chlorophyl pigment has been completely bleached; which will have the pleasant and agreeable taste or flavor of the bleached and taste-purified beany substance free from the characteristic unpleasant acrid or raw bean taste or flavor and free from any foreign salts or other foreign substances introduced during the process as a reaction product of a neutralizing agent with the bleaching agent; which will have the proteins in the natural condition unaltered by the process of bleaching and taste-purifying and soluble in water; which will have the proteins and fatty substances in their natural combined form unaltered by the process of oxidizing the pigmented and acrid-tasting substances for the purpose of bleaching and taste-purifying; and which will also have the enzymes in an active state. Furthermore, that my improved product when dried subsequent to the practicing of my process, is capable of long conservation or storage without becoming rancid.

Having described my invention, I claim:—

1. In a process of manufacturing a refined vegetable product, the step of expanding leguminous materials containing acrid-tasting bodies and colored substances with an aqueous solution of sulphur dioxide ($SO_2$ plus $H_2O$), and eliminating the excess of said sulphur dioxide ($SO_2$).

2. In a process of manufacturing a refined vegetable product, the step of expanding a charge composed of soya beans containing acrid-tasting bodies and colored substances having the cellular structure thereof unruptured with an aqueous solution of sulphur dioxide ($SO_2$ plus $H_2O$), and eliminating the excess of said sulphur dioxide ($SO_2$).

3. The process of manufacturing a refined vegetable product, comprising the expanding of a charge of the acrid-tasting bodies and colored leguminous materials with an aqueous solution containing an excess of sulphur dioxide ($SO_2$ plus $H_2O$) and applying heat to the expanded charge to liberate the sulphur dioxide to produce with said acrid-tasting and colored substances a harmless, white oxidized product, and to eliminate the excess of sulphur dioxide from the materials.

4. The process of manufacturing a refined vegetable product, comprising the expansion of a charge of soya beans containing acrid-tasting bodies and colored substances having the cellular structure thereof unruptured with a water solution containing an excess of sulphur dioxide, and applying heat in a plurality of operations to the charge to liberate the sulphur dioxide from the solution to produce with said acrid-tasting and colored substances a harmless, white oxidized product, and to eliminate the excess of sulphur dioxide from the materials while maintaining the beans in an uncoagulated state.

5. The process of manufacturing a refined vegetable product, comprising the expansion of a charge of dried soya beans containing acrid-tasting bodies and colored substances having the cellular structure of the beans unruptured with a water solution containing an excess of sulphur dioxide ($SO_2$ plus $H_2O$), and heating the charge in a plurality of operations to liberate the sulphur dioxide from the solution to produce with said acrid-tasting and colored substances a harmless, white oxidized product, and to eliminate the excess of sulphur dioxide from the materials while maintaining the beans in an uncoagulated state.

6. The process of manufacturing a refined vegetable product, comprising the expansion of a charge of soya beans containing acrid-tasting bodies and colored substances having the cellular structure of the beans unruptured with a water solution of sulphur dioxide ($SO_2$ plus $H_2O$), subjecting the said expanded charge to heat while immersed in pure water to liberate the sulphur dioxide from the solution on the charge of beans and to produce with said acrid-tasting and colored substances a harmless, white oxidized product, and to eliminate the excess of sulphur dioxide from the materials and also to accelerate and facilitate the elimination of free sulphur dioxide with increased speed.

7. The process of manufacturing a refined vegetable product, comprising the expansion of a charge of soya beans containing acrid-tasting bodies and colored substances having the cellular structure of the beans unruptured with a water solution of sulphur dioxide ($SO_2$ plus $H_2O$), subjecting the said expanded charge to heat while immersed in pure water and also subjecting the charge to a current of steam to liberate the sulphur dioxide from the solution in the charge of beans to produce with said acrid-tasting and colored substances a harmless, white oxidized product, and to eliminate the excess of sulphur dioxide from the materials and also to accelerate and facilitate the elimination of free sulphur dioxide with increased speed.

MICHELE BONOTTO.